Nov. 8, 1960
H. T. BUDENBOM
2,959,751
COMPENSATED HYBRID RING
Filed March 24, 1953
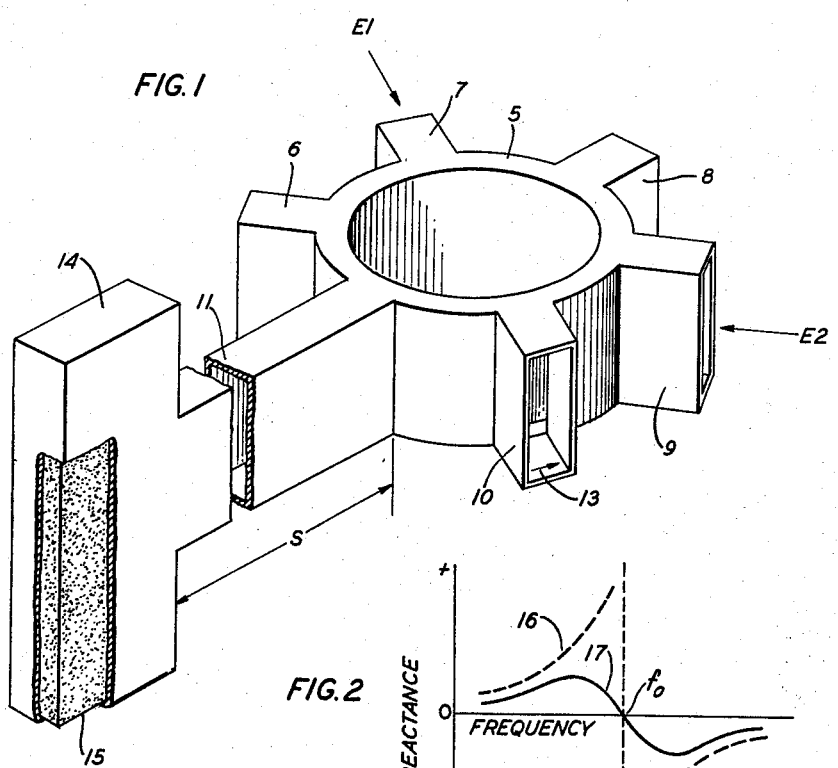
FIG. 1
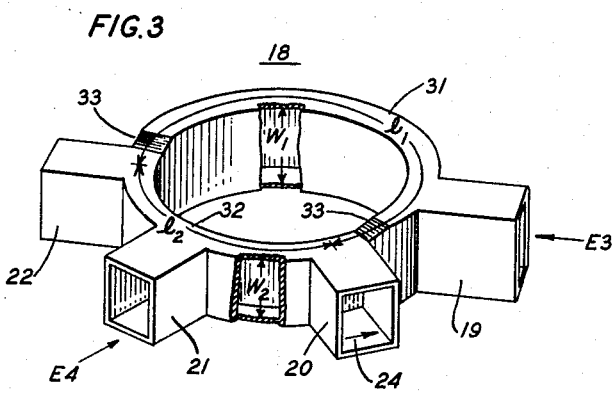
FIG. 2
FIG. 3
INVENTOR
*H. T. BUDENBOM*
BY *Ralph P. Holcomb*
ATTORNEY United States Patent Office 2,959,751
Patented Nov. 8, 1960

2,959,751

COMPENSATED HYBRID RING

Horace T. Budenbom, Short Hills, N.J., assignor to Bell Telephone Laboratories, Incorporated, New York, N.Y., a corporation of New York Filed Mar. 24, 1953, Ser. No. 344,393

1 Claim. (Cl. 333—11)

This invention relates to wave transmission networks and more particularly to compensated hybrid rings.

The object of the invention is to increase the frequency range of a hybrid ring.

More specifically, the object is to increase the frequency range over which a high null balance may be obtained in a multi-arm hybrid ring having conjugate properties.

It is known that multi-arm hybrid rings may be designed to be conjugate at one or more pairs of arms. Structures of this type are disclosed, for example, in United States Patent No. 2,445,895, to W. A. Tyrrell, issued July 27, 1948, in a paper by W. A. Tyrrell entitled "Hybrid Circuits for Microwaves," published in the November 1947 issue of the Proceedings of the I.R.E., in my paper entitled "Analysis and Performance of Waveguide-Hybrid Rings for Microwaves," published in the July 1948 issue of the Bell System Technical Journal, and in my copending patent application Serial No. 52,856, filed October 5, 1948, now Patent No. 2,784,381, issued March 5, 1957. The conjugate properties of such a ring may, for example, be utilized in a branching arrangement or in a network for obtaining the complex sum of and difference between two coherent voltages. One such hybrid ring comprises a section of wave guide, coaxial cable, or other type of transmission line having a length equal to 1½ wavelengths $\lambda_{g0}$ in the line at the selected mid-band design frequency $f_0$ formed into a closed loop or ring and provided with four branches or arms connected in series with the rings at successive points thereon spaced apart a distance of $\lambda_{g0}/4$. If the four branches are of proper impedance and iteratively terminated, two non-adjacent branching points on the ring will be conjugate, the remaining pair of branching points will also be conjugate, and there will be a good impedance match between the ring and the branches. Another series branch, spaced a distance of $\lambda_{g0}/4$ from the nearest branch, may be added to provide a five-arm hybrid ring also having well-known biconjugate properties.

A hybrid ring of this type may be used to obtain the complex sum of and difference between two coherent voltages applied, respectively, to two of the conjugate branches. A voltage proportional to the sum appears at the intermediate branch. In a four-arm ring, a voltage proportional to the difference appears at the remaining branch. If the ring has five arms, the difference voltage may be obtained by combining the output voltages on the other two branches. The accuracy of the sum and the difference thus obtained depends upon the null balance of the ring, which, in turn, is dependent upon having a difference of $\lambda_{g0}/2$ between the sum and the difference branches when measured in the two directions around the ring. In properly designed rings, a high null balance is obtainable at the frequency $f_0$, but if the operating frequency deviates to either side of $f_0$, the balance falls off rather sharply. This occurs because, as the operating frequency departs from $f_0$, the difference in the paths becomes either greater or less than the desired $\lambda_{g0}/2$. In accordance with the present invention, the performance of such a hybrid ring is greatly improved by introducing into one or both of the paths phase compensation so selected that their difference remains substantially equal to $\lambda_{g0}/2$ over a considerable range of frequencies extending to either side of the design frequency $f_0$.

In one embodiment, the compensation is provided by connecting one or more reactive impedances to the ring at one or more selected points. The impedance may, for example, comprise a cavity resonator connected effectively in series with the ring. In order to get the desired shape of reactance characteristic, the resonator is ordinarily partly or entirely filled with appropriate dissipative material. The resonator may be antiresonant at the frequency $f_0$, in which case it is connected to the ring either directly or by means of a section of transmission line having a length equal to an integral multiple of $\lambda_{g0}/2$. Alternatively, the resonator may be resonant at the frequency $f_0$ and connected to the ring through a section of transmission line having a length equal to an odd integral multiple of $\lambda_{g0}/4$. In the latter case, the impedance level may be transformed either up or down, if desired.

In a second embodiment of the invention, the phase compensation is provided by employing for the longer path a transmission line in which the phase shift changes with frequency at a slower rate than in the transmission line used for the shorter path. If the ring is constituted by a hollow-pipe wave guide of oblong cross section, the rate of phase shift change may be controlled by a choice of the larger transverse dimension. The two portions of the ring are, therefore, made up of two sections of wave guide which differ in their larger transverse dimensions. Preferably, the longer section of wave guide is the wider.

The nature of the invention and its various objects, features, and advantages will appear more fully in the following detailed description of typical embodiments illustrated in the accompanying drawing, of which Fig. 1 is a perspective view, with portions broken out, of a five-arm hybrid ring in accordance with one embodiment of the invention in which phase compensation is provided by a reactive impedance;

Fig. 2 shows a typical reactance-frequency characteristic of an impedance suitable for use with the ring of Fig. 1; and Fig. 3 is a perspective view, with portions broken out, of a four-arm hybrid ring in accordance with a second embodiment of the invention in which phase compensation is provided by increasing the larger transverse dimension of a portion of the wave guide constituting the ring.

The hybrid ring shown in Fig. 1 comprises a section of transmission line formed into a loop or ring 5 and provided with six equally spaced transmission branches or arms 6 to 11. As shown, the ring and the branches are made of hollow-pipe wave guide of oblong cross section, adapted to transmit electromagnetic waves having an electric field parallel to the smaller transverse dimension, as indicated by the arrow 13 in the branch 10. It is to be understood that the ring and branches may also be constituted by coaxial cable or some other suitable type of transmission line. In the ring 5, the smaller transverse dimension of the guide is parallel with the plane of the ring. The branches are connected to the ring in the electric plane; that is, they branch from a wider side of the ring and the smaller transverse dimension of each branch is parallel with the plane of the ring. This corresponds to a series electrical connection. The ring 5 has a mean circumference equal to $1\tfrac{1}{2}\lambda_{g0}$ and therefore, the branches 6 to 11 have a spacing around the ring of $\lambda_{g0}/4$ between centers. Each of the branches has the same characteristic impedance $Z_0$. The wave guide forming the ring 5 has a characteristic impedance equal to $Z_0\sqrt{2}$. The branch 11 is terminated in a reactive impedance 14 in the form of a cavity resonator filled with dissipative material 15 which may, for example, comprise powdered carbon embedded in a suitable ceramic.

The hybrid ring just described may, for example, be used to obtain the sum of and difference between two coherent voltages of frequency $f_0$. If the voltages are applied, respectively, to the conjugate arms 7 and 9, as indicated by the arrows E1 and E2, a voltage proportional to their complex sum will appear at the intervening arm 8, and a voltage proportional to their complex difference will appear at the arm 6 and also at the arm 10. Even in the absence of the arm 11, if the input voltages deviate from the frequency $f_0$, the output voltages at the arms 6 and 10 will be oppositely phased and may be combined differentially to provide a sort of first-order cancellation of frequency sensitivity, thus increasing the useful frequency range.

A criterion of the performance of such a hybrid ring is the difference in the lengths of the two parallel transmission paths around the ring 5 between the sum arm 8 and the difference arm 6 and also the difference in the paths between the arm 8 and the other difference arm 10. For optimum performance, each of these differences should be equal to $\lambda_{g0}/2$, the value at the design frequency $f_0$. However, the difference changes if the operating frequency changes. If the frequency is increased, the difference increases, and if the frequency is decreased, the difference decreases. In accordance with the present invention, this change in the $\lambda_{g0}/2$ difference is greatly reduced over a considerable frequency range by introducing phase compensation into the ring 5.

In Fig. 1, this phase compensation is provided by the branch 11 and the associated reactive impedance 14. If the impedance is connected effectively in series with the ring 5 at a point located between the arms 6 and 10, it must have a positive reactance at frequencies below $f_0$ and a negative reactance at frequencies above $f_0$. An impedance which is antiresonant at the frequence $f_0$, having the reactance-frequency characteristic shown by the broken-line curve 16 of Fig. 2, is of the proper type. The required slope in the neighborhood of the frequency $f_0$ may be obtained by adding resistance to damp the circuit. A typical resultant characteristic is shown by the solid-line curve 17 of Fig. 2. With such an impedance, good phase compensation is provided in the frequency range over which the reactance characteristic approximates a straight line of the proper slope. Fig. 1 shows a suitable impedance in the form of the cavity resonator 14 which is properly damped by means of the dissipative material 15 therein. The resonator 14 may be antiresonant at the frequency $f_0$ and connected to the ring 5 either directly or through a section of wave guide 11 which has a length S equal to an integral number of half wavelengths within the guide. Alternatively, the resonator 14 may be resonant at the frequency $f_0$, in which case the length S will be equal to an odd integral number of quarter wavelengths. The impedance-inverting property of the connecting branch 11 will make the impedance as viewed from the ring 5 appear to be antiresonant. In this latter case, advantage may be taken of the impedance-transforming property of the guide 11 to transform the impedance level either up or down. The amount of impedance transformation obtained depends upon the characteristic impedance of the connecting branch 11. The branch 11 is preferably connected to the ring 5 at a point mid-way between the branches 6 and 10 and will, therefore, be spaced at a distance of $\lambda_{g0}/4$ from each.

Fig. 3 shows a second embodiment of the invention, in which phase compensation is applied to a four-arm hybrid ring. A hollow-pipe wave guide of oblong cross section having a length approximately equal to $1\tfrac{1}{2}\lambda_{g0}$ is formed into a closed loop or ring 18 and provided with four branches or arms 19 to 22 spaced from each other a distance of $\lambda_{g0}/4$. The electric field of the electromagnetic waves in the ring and also in the branches is assumed to be parallel with the plane of the ring, as indicated by the arrow 24 in the branch 20. The branches are, therefore, connected effectively in series with the ring 18. Such a hybrid ring may be used in obtaining the sum of and difference between two coherent voltages applied to the conjugate branches 19 and 21, as indicated by the arrows E3 and E4. A voltage proportional to their sum will appear at the intervening branch 20 and a voltage proportional to their difference at the remaining branch 22. The accuracy of the measurements obtainable at frequencies above or below the frequency $f_0$ depends upon maintaining a difference of $\lambda_{g0}/2$ between the lengths of the two parallel paths around the ring 18 between the sum arm 20 and the difference arm 22. The required phase compensation in this case is provided by using for the longer path 31 of length $l_1$ a wave guide in which the phase shift changes with frequency at a slower rate than in the wave guide used for the shorter path 32 of length $l_2$. As shown, this is accomplished by making the larger inside transverse dimension or width $W_1$ of the longer section of guide 31 of a proper value greater than the inside width $W_2$ of the shorter section of guide 32. The width $W_2$ is ordinarily made only large enough to permit transmission of the lowest frequency $f_1$ in the desired operating range. The wider section 31 is preferably tapered in width at its ends to match the width of the narrower section 32, as shown at the points 33.

There will now be presented a suggested design procedure for obtaining the required lengths $l_1$, $l_2$ and the widths $W_1$, $W_2$, employing a method of trial and error. It will be assumed that the hybrid ring is to have an operating band width of 2K cycles per second extending between a lower frequency $f_1$ and an upper frequency $f_2$ and centered at the mid-band frequency $f_0$. Therefore, $$f_1 = f_0 - K \tag{1}$$

and $$f_2 = f_0 + K \tag{2}$$

The wavelengths in air corresponding to $f_0$, $f_1$, and $f_2$ will be designated $\lambda_{a0}$, $\lambda_{a1}$, and $\lambda_{a2}$, respectively.

The phase shift $\theta$, expressed in radians, in a wave guide of length $l$ is given by $$\theta = 2\pi l / \lambda_g \tag{3}$$

where $\lambda_g$ is the wavelength in the guide. Since $$\lambda_g = \lambda_a / \sqrt{1 - (\lambda_a/\lambda_c)^2} \tag{4}$$

where $\lambda_a$ is the wavelength in air and $\lambda_c$ is the cut-off wavelength of the guide, we have from Equations 3 and 4

$$\theta = 2\pi l \sqrt{1 - (\lambda_a/\lambda_c)^2} / \lambda_a \tag{5}$$

If the phase shifts in the path 31 at the frequencies $f_1$ and $f_2$ are designated $\theta_{11}$ and $\theta_{12}$, respectively, and those in the path 32 at the same frequencies are $\theta_{21}$ and $\theta_{22}$, respectively, we may write the following expressions, based on Equation 5:

$$\theta_{11} = 2\pi l_1 \sqrt{1 - (\lambda_{a1}/\lambda_{c1})^2} / \lambda_{a1} \tag{6}$$

$$\theta_{12} = 2\pi l_1 \sqrt{1 - (\lambda_{a2}/\lambda_{c1})^2} / \lambda_{a2} \tag{7}$$

$$\theta_{21} = 2\pi l_2 \sqrt{1 - (\lambda_{a1}/\lambda_{c2})^2} / \lambda_{a1} \tag{8}$$

$$\theta_{22} = 2\pi l_2 \sqrt{1 - (\lambda_{a2}/\lambda_{c2})^2} / \lambda_{a2} \tag{9}$$

in which $\lambda_{c1}$ and $\lambda_{c2}$ are the cut-off wavelengths in the paths 31 and 32, respectively.

In Equations 6 through 9 the unknown quantities are $l_1$, $l_2$, $\lambda_{c1}$, and $\lambda_{c2}$. It is desired that, at the frequency $f_0$, the two paths 31 and 32 will have the approximate relationships $$l_1 \doteq \lambda_{g01} \quad (10)$$

and $$l_2 \doteq \lambda_{g02}/2 \quad (11)$$

where $\lambda_{g01}$ is the wavelength in the section 31 and $\lambda_{g02}$ is the wavelength in the section 32. But, as is seen from Equation 4, $\lambda_{g01}$ and $\lambda_{g02}$ cannot be found until $\lambda_{c1}$ and $\lambda_{c2}$ are determined. For a first trial, however, it may be assumed that $$l_1 = \lambda_{a0} \quad (12)$$
$$l_2 = \lambda_{a0}/2 \quad (13)$$

and $$\lambda_{c2} = \lambda_{a1} \quad (14)$$

It is also assumed that $\lambda_{c1}$ is slightly larger than $\lambda_{c2}$, say $$\lambda_{c1} = 1.01 \lambda_{c2} \quad (15)$$

Since all of the quantities in Equations 6 through 9 have been selected for the first trial, the phase shifts $\theta_{11}$, $\theta_{12}$, $\theta_{21}$, and $\theta_{22}$ may now be computed. Next, find the difference $\theta_{d1}$ between the phase shifts $\theta_{11}$ and $\theta_{21}$, and the difference $\theta_{d2}$ between $\theta_{12}$ and $\theta_{22}$, that is, compute $$\theta_{d1} = \theta_{11} - \theta_{21} \quad (16)$$

and $$\theta_{d2} = \theta_{12} - \theta_{22} \quad (17)$$

For best performance of the hybrid ring over the band from $f_1$ to $f_2$, it is desired that, at the band limits, the departures of these differences from $\pi$ should be equal but of opposite sign, that is, that $$\theta_{d1} - \pi = \pi - \theta_{d2} \quad (18)$$

from which $$\theta_{d1} + \theta_{d2} = 2\pi \quad (18')$$

If this relationship is not obtained within the desired limits in the first trial, additional trials may be made, using different selected values for one or more of the quantities $\lambda_{c1}$, $\lambda_{c2}$, $l_1$, and $l_2$. In choosing the values of $l_1$ and $l_2$, it should be borne in mind that the relationships given in Equations 10 and 11 must be maintained at least approximately. Usually a few trials will suffice to satisfy Equation 18 within acceptable limits. It is found that the departures from $\pi$ of the phase differences $\theta_{d1}$ and $\theta_{d2}$ are too large, it means that the selected band width $2K$ is too large and must be reduced.

When a compatible set of values for $l_1$, $l_2$, $\lambda_{c1}$, and $\lambda_{c2}$ has been found, the lengths of the two sections of guide 31 and 32 are known at once. The widths $W_1$ and $W_2$ are found from the formulas $$W_1 = \lambda_{c2}/2 \quad (19)$$

and $$W_2 = \lambda_{c2}/2 \quad (20)$$

It is to be understood that the above-described arrangements are illustrative of the application of the principles of the invention. Numerous other arrangements may be devised by those skilled in the art without departing from the spirit and scope of the invention.

The embodiment of the invention shown in Fig. 1 is claimed in my copending divisional application Serial No. 648,440, filed March 25, 1957, now Patent 2,943,273, issued June 28, 1960.

What is claimed is:

A compensated, wide-band hybrid ring comprising a hollow-pipe wave guide of oblong cross section having a length approximately equal to 1½ wavelengths $\lambda_{g0}$ within the guide at a selected frequency $f_0$ formed into a closed loop and four transmission branches connected effectively in series with said loop at successive points thereon spaced apart a distance approximately equal to $\lambda_{g0}/4$, the longer of the portions of said guide constituting the two parallel paths between two non-adjacent ones of said points having a width which is greater than the width of the shorter of said portions, and the lengths and widths of said portions being so chosen that the phase shifts in said paths have a substantially contant difference of $\pi$ radians over a considerable band of frequencies centered at $f_0$ and the sum of the differences in said phase shifts at the edges of said band is approximately equal to $2\pi$ radians.

References Cited in the file of this patent

UNITED STATES PATENTS

| | | |
|---|---|---|
| 2,531,447 | Lewis | Nov. 28, 1950 |
| 2,609,447 | Graef | Sept. 2, 1952 |
| 2,633,492 | Ring | Mar. 31, 1953 |
| 2,634,331 | Honda | Apr. 7, 1953 |
| 2,660,710 | Blancher | Nov. 24, 1953 |
| 2,705,777 | Denis | Apr. 5, 1955 |